Jan. 11, 1966   E. NOHL   3,229,006
PROCESS FOR THE PRODUCTION OF TUBES OF SYNTHETIC
PLASTICS OR THE LIKE
Filed April 5, 1962
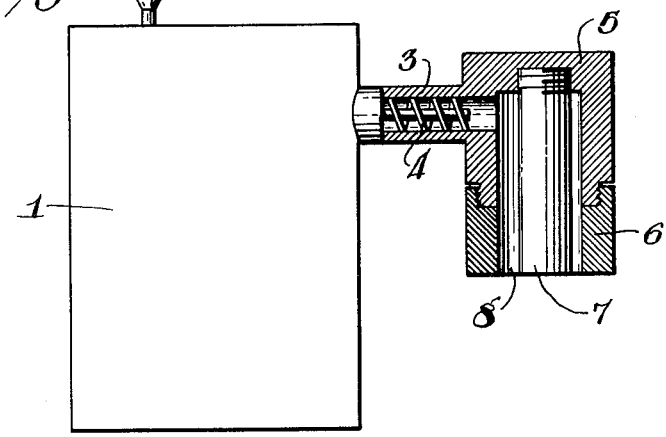
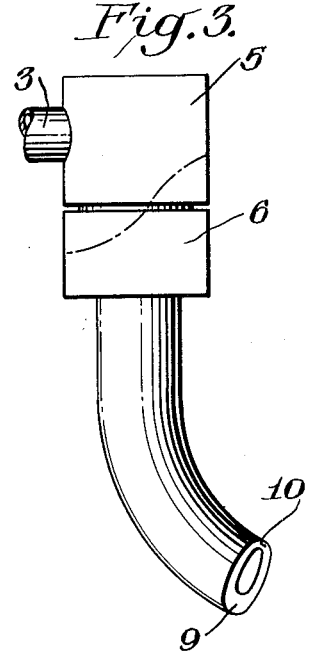
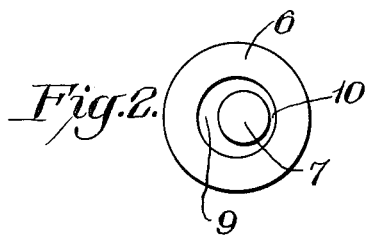
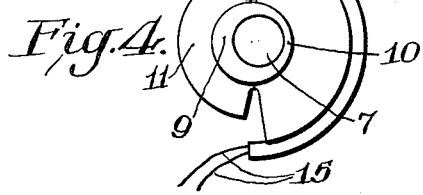
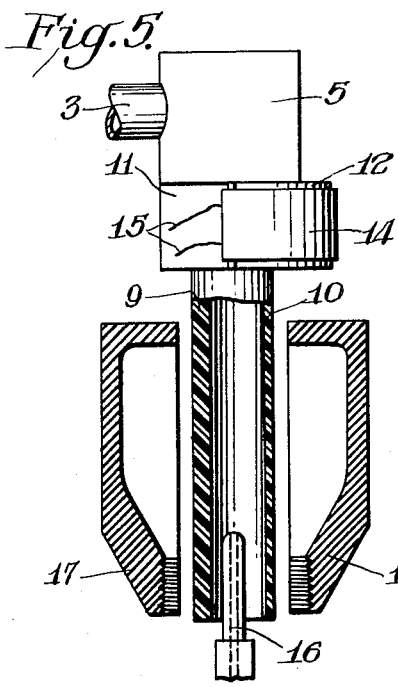
INVENTOR
EGON NOHL
BY Connolly and Hutz
ATTORNEYS

United States Patent Office 3,229,006
Patented Jan. 11, 1966

3,229,006
PROCESS FOR THE PRODUCTION OF TUBES OF SYNTHETIC PLASTICS OR THE LIKE
Egon Nohl, Wiener Neustadt, Austria, assignor of one-half each to Friedrich Hobiger, Rossauerlande, and Leopold Hobiger, Lindengasse, Austria
Filed Apr. 5, 1962, Ser. No. 185,324
Claims priority, application Austria, Apr. 7, 1961,
A 2,828/61
4 Claims. (Cl. 264—98)

My invention relates to a process for the production of tubes of synthetic plastic material or the like with unequal wall thicknesses, particularly for the production of hollow bodies from such tubes in which the synthetic plastic material is supplied to the mouth-piece of an extrusion apparatus, and apparatus for carrying out this method.

A process is known for producing a tube with unequal wall thicknesses in which a thermoplastic material is supplied to a nozzle of a tube extrusion press with eccentrically attached pins and the velocity of flow of the synthetic plastic material through the nozzle cross-section varied within a desired range.

With this and other known methods for the production of tubes with unequal wall thicknesses in which an extrusion press is used, the tubes are drawn rectilinearly after leaving the mouth-piece of the extrusion press, so that there is no distortion of the tubes.

If a hollow body should be produced from such a tube of synthetic plastic or the like, the application of this method is not possible because the end of the extruded tube must always be directed to the blowing nozzle of a blowing apparatus, which blowing nozzle, for example, is located perpendicularly below the extrusion orifice of the extruder, in which case the tube must fall freely to reach the blowing nozzle, and the blowing nozzle must be inserted into the tube. If one wishes to do this without further provision, the exiting tube will bend and thereby the insertion of the blowing nozzle into the lower tube opening is impossible.

It is one object of the present invention to provide a method of producing tubes of synthetic plastics or the like, which obviates this disadvantage, more particularly a method of producing hollow bodies from a tube having wall portions of unequal thicknesses.

It is another object of the present invention to provide a method of producing tubes of synthetic plastics or the like, wherein for the attainment of a rectilinear tube, the synthetic plastic material is raised to a higher temperature in the nozzle in the region of the wall portion having a smaller thickness than the remaining wall portion. It is still another object of the present invention to provide a method of producing tubes of synthetic plastics or the like, wherein the nozzle of the extruder exhibits has different temperature zones, i.e. by heating or cooling a zone of the nozzle, or both, whereby in the region of the tube wall portion of lesser thickness the nozzle temperature is higher than in the region of the remaining wall portion.

It is yet another object of the present invention to provide a method of producing tubes of synthetic plastics or the like, wherein the nozzle of an extrusion press is provided with several substantially annular segments which are in poor thermal contact, while at least at the portion of the nozzle opening corresponding to the wall portion having a smaller cross-section the adjacent annular segments are provided with heating devices and/or the remaining annular segments with cooling devices. Preferably, the more strongly heated annular segments are made of a better heat-conductive material than the remaining annular segments. For example, for the more strongly heated annular segments copper may be used, and for the remaining annular segments iron, or steel, may be used. The separation of the individual annular segments is assured by providing layers constituted of a poor heat-conductive material.

A particularly simple, and in practice, exceptionally useful embodiment of an apparatus for carrying out the process according to the present invention is that provided for the manufacture of a tube with an eccentrically located opening. In that case the nozzle comprises two annular segments each extending over 180° which are interconnected by a thin bridge of a material of poor heat conductivity to impede the flow of heat. In this construction, it has proven very advantageous in particular to provide, on the outer periphery of the nozzle two diametrically located V-shaped notches for the attachment of the bridge.

For heating of one annular segment in this such constructed nozzle, it has proven advantageous to dimension this annular segment more ruggedly than the others and to provide over this annular segment a special semi-cylindrical shell-shaped electric heating element. This can be constructed to be slightly flexible and, if necessary, be secured solely by this flexibility.

The available temperature difference can also be attained by cooling the annular segments of the extrusion nozzle, for example with water, air, or the like.

With these and other objects in view, which will become apparent in the following detailed description, the present invention will be clearly understood in connection with the accompanying drawing, in which:

FIGURE 1 is a schematic elevation of an extrusion apparatus, the extrusion head of which being shown in section;

FIG. 2 is a bottom plan view of the nozzle of the extrusion apparatus, as disclosed in FIG. 1;

FIG. 3 is an elevation of the extrusion head of the apparatus disclosed in FIG. 1 together with a portion of the emerging tube piece;

FIG. 4 shows a bottom plan view of a nozzle designed in accordance with the present invention;

FIG. 5 is an elevation of an extrusion head with a blowing apparatus in section on the underside of the exit portion of the nozzle; and FIG. 6 is an end view of the formation of a hollow body designed by example in accordance with the present invention.

Referring now to the drawing, and in particular to FIG. 1, the extrusion apparatus 1 which is disclosed very schematically only has a charging funnel 2 for the synthetic plastic material which may be, for example, a granular synthetic plastic material. The structure of the extrusion apparatus 1 is known and, therefore, not further illustrated. The synthetic plastic material is, after being heated, conveyed by a worm 4 through a tube 3 to an extruder head 5, to which a nozzle 6 is secured, for example by a thread 6', as shown in FIG. 1 of the drawing, and further also a core 7, for example, likewise by a thread 7'. The nozzle 6 can also be secured to the extruder head 5 by a locking pin (not shown). It is also possible, however, in this case, if necessary, to provide the nozzle 6 with several elevations, as is illustrated, for example, by dotted lines in FIG. 3. With this construction of the nozzle 6, it is possible to heat, or cool, the synthetic plastic at that position where the annular segments have a higher elevation, as compared with a nozzle where all annular segments have the same elevation.

The doughy synthetic plastic material, which is conveyed by the worm 4, surrounds the core 7 in the extruder head 5 and is discharged by the extruder head 5 and the nozzle 6 at the open end 8 and flows off as a tubular strand. Of course, it is possible, as is known, to heat the entire extruder head 5 to a certain temperature, which temperature can be maintained, for example, at 200° C. If now the core 7, as seen more particularly in FIG. 2, is arranged eccentrically to the nozzle 6, which is clearly visible, a tubular strand with an irregular wall thickness will be formed; and, obviously, this tubular strand has a larger wall thickness 9, at one side, and a smaller wall thickness at the opposite side. If the manufacture of the tubular strand is performed further without precautionary measures, it will be observed that the tubular strand will be deformed as shown in FIG. 3, i.e., the tube will bend sharply to one side. As can be seen, the thinnest wall section 10 will be at the center-point of the bend.

This flexure of the tubular strands may be explained as follows. Due to the fact that the tube has different wall thicknesses at opposite sides thereof, it cools non-uniformly, i.e. the thicker wall sections cool more slowly than the thinner wall sections. Consequently, the tubular strand will flex at the point at which the wall section is thinnest. It is, therefore, evident that due to uncontrollable bending of the tubular strand, it is not possible to process the tube further immediately by directing it rectilinearly downwards toward a blowing nozzle, by which it then could be pressed against two halves of a mold.

For the production of a rectilinear tube with wall portions of different thicknesses, it is essential, therefore, that the tubular strand emerges and drops out of the extruder head 5 and from the nozzle 6, respectively, rectilinearly. In order to attain this objective, the nozzle 6 is formed, according to the present invention, as shown in FIG. 4. As disclosed, the side of the tubular strand which is to have the thinner wall section is heated to a higher temperature, by selective heating, than the temperature of the nozzle 6, or the extruder head 5.

The nozzle 6a, as shown in FIG. 4, comprises two annular segments 11 and 12. The annular segment 11 is located at the side 9' and the annular segment 12 is located at the side 10'. These correspond, respectively, to the respective thicker and thinner wall portions 9 and 10 of the tubular strand. Between these two annular segments there are only thin connecting bridges 13, which provide a mechanical connection between the two annular segments 11 and 12. These bridges 13, however, insure the least possible heat-conductive connection between the two annular segments 11 and 12. Preferably, the two illustrated annular segments should consist of materials of different heat-conductivities. Thus, the annular segment 12, which must be heated to a higher temperature, and is on the side 10 of the tubular strand having the thinner wall section 10, should consist of a better heat-conductive material, such as copper, or aluminum; whereas, the other annular segment 11 should be made of a material having a lower heat-conductivity, such as iron, or steel. To supply heat to the annular segment 12, a heating element 14 is provided which is in the form of a semicylindrical shell which, being slightly elastic, surrounds the annular segment 12 without further attachment. This heating element should, preferably, be an electrical heating element, which is equipped with feeding wires 15.

With the construction of the nozzle illustrated in FIG. 4, it is now possible that the tubular strand, upon leaving the nozzle 6a, will exhibit a higher temperature on the side 10 having the thinner wall thickness, as compared with the opposite side, so that, as seen over its entire circumference, it is accordingly uniformly plastic, and therefore, during emergency, and dropping from the extruder head 5, no distortion will occur.

For the attainment of an absolutely rectilinear extruded tube, it is essential that the temperature difference between the annular segements 11 and 12 be best chosen, in practice, by experiment. This temperature difference depends, among other things, upon the materials used. For example, the temperature difference may be about 40° C.; also, for example, the annular segment 11 may be at a temperature of 180° C., and the annular segment 12 at a temperature of 220° C. The characteristics of the heating element 14 must also be such that the higher temperature required, i.e., 40° C. above that of the extruder head 5, can be reached.

This temperature difference may be applied, for example, to various types of polypropylene. For other types of synthetic plastics, for example, polyethylene, a temperature difference of about 60° C. to 80° C. may be employed. Under no circumstances should these temperature differences be considered an absolute limit, since other available synthetic plastics may permit temperature differences of 100° C., or more, in order to achieve a satisfactory result. It should also be noted that the applicable temperature difference should not be determined solely by the thermoplastic material employed, but also by the cross-sectional wall thickness of the tube, the comparative wall thicknesses of the thicker and thinner wall sections 9 and 10, by the temperature drop in the extruder head, by the ejection speed, by the external temperature, as well as many other factors, so that a definite specification of the requisite temperature difference can only be obtained experimentally, prior to production, in response to the respective factors mentioned above.

FIG. 5 shows schematically how hollow bodies may be produced from a tube with wall sections of unequal thickness. In this case, only the extruder head 5 is shown, which is provided with a nozzle 6a. The tubular strand, having wall sections of unequal thickness 9 and 10, drops out of the nozzle 6 rectilinearly, and receives a blowing nozzle 16 which may be inserted into it. Mold halves 17 and 18 are fitted around the tubular strand, thus creating a mold for blowing a hollow body. The device for the insertion of the blowing nozzle and for fitting the two halves of the mold 17 and 18 (not shown) is well known to those skilled in this art, and forms no part of the present invention. It may be noted in this connection, however, that the present invention does reside in the special construction of the nozzle 6a of the extruder head 5, with which it is now possible to use known types of blowing apparatus for producing hollow bodies made of synthetic plastic tubular strands having wall sections 9 and 10 of unequal thicknesses. This would not have been heretofore possible without the aid of the present invention, as particularly demonstrated more clearly in FIG. 3.

As an example of a hollow body made of a synthetic plastic tubular strand having wall sections 9 and 10 of unequal thicknesses, there is illustrated in FIG. 6 a cross-section of a bottle having a semi-circular groove with a thicker wall section, for attachment to a rod, or the like, by pressing, sliding, etc. The bottle also consists of a thin-walled portion, which may be filled with fluid or the like. Such a bottle may be used for floor-polishing, cleaning purposes, and the like. It should be understood, of course, that this invention is not limited to such applications, but that various other modifications of hollow bodies may be produced by the present invention. There is no limit to the production of hollow bodies having more complicated forms, or shapes, with wall sections of equal, or unequal wall thicknesses. For instance, portions which are not required to have strength may be made more economically without any sacrifice in quality.

The present invention is not limited either to a particular choice of material since the choice may depend upon a number of factors such as its availability, suitability in the finished article in withstanding hard usage, cost of the material, etc. Likewise, the present invention is not limited to the use of an electrical heating element to heat the annular segment, since flame heating or any other suitable heat source may also be used to reach the desired temperature.

Furthermore, it is also possible to manufacture tubular strands with wall-sections of unequal thickness, by heating the tube after it leaves the nozzle 6. The heat may be applied, for example, after the tubular strand leaves the extruder head 5 on the side where the wall section should be made thinner. Of course, several of these features may even be combined. Obviously, selective heating of portions of the nozzle 6a may be combined with heating of the tubular strand itself after it leaves the extruder head 5.

While I have thus described my invention in connection with several specific examples and embodiments thereof, it will be apparent to those skilled in this art that other modifications thereof are possible without departing from the spirit and scope of the invention which is defined in the objects and in the appended claims.

What I claim is:

1. A method of manufacturing a tube of synthetic plastic material having wall sections of unequal thickness, comprising the steps of
    extruding synthetic plastic material eccentrically through an extrusion opening with respect to its wall thickness to form a hollow tubular strand, and
    heating the side having the thinner portion of the wall of said tubular strand as it is being extruded to a higher temperature than the side having the thicker portion of the wall of said tube, whereby said tubular strand will retain its rectilinear alignment upon cooling.

2. The method, as set forth in claim 1, wherein
    said thinner portion of the wall of said tubular strand is heated to a temperature at least about 40° C. higher than said thicker portion of said wall of said tubular strand.

3. The method, as set forth in claim 2, wherein
    said synthetic plastic material is polypropylene and is heated prior to its emergence from said extrusion opening to a given temperature of at least about 180° C., and
    the thinner portion of the wall of said tubular strand is heated to a temperature at least about 40° C. higher than said given temperature.

4. The method, as set forth in claim 1, which includes the step of
    blowing up said tubular strand within a confined molding space to form a hollow body of different cross-sections about its periphery.

References Cited by the Examiner
UNITED STATES PATENTS

| | | | |
|---|---|---|---|
| 1,504,653 | 8/1924 | Taylor | 264—209 |
| 2,559,386 | 7/1951 | Bailey | 264—95 |
| 2,574,555 | 11/1951 | Galloway | 18—14 |
| 2,780,835 | 2/1957 | Sherman | 18—14 |
| 2,972,780 | 2/1961 | Boonstra | 18—55 |
| 3,057,013 | 10/1962 | Loveless | 18—55 |

ROBERT F. WHITE, *Primary Examiner.*

MICHAEL V. BRINDISI, *Examiner.*